US012590484B2

(12) United States Patent
Heinl et al.

(10) Patent No.: US 12,590,484 B2
(45) Date of Patent: Mar. 31, 2026

(54) WIRE ROPE SYSTEM

(71) Applicant: SCHERDEL INNOTEC Forschungs-und Entwicklungs-GmbH, Marktredwitz (DE)

(72) Inventors: Thomas Heinl, Marktredwitz (DE); David Farrell, Muskegon, MI (US)

(73) Assignee: SCHERDEL INNOTEC FORSCHUNGS- UND ENTWICKLUNGS-GMBH, Marktredwitz (DE)

( * ) Notice: Subject to any disclaimer, the term of this patent is extended or adjusted under 35 U.S.C. 154(b) by 351 days.

(21) Appl. No.: 18/231,874

(22) Filed: Aug. 9, 2023

(65) Prior Publication Data

US 2025/0052103 A1 Feb. 13, 2025

(51) Int. Cl.
*E05F 1/10* (2006.01)
*B62D 33/03* (2006.01)
*E05F 3/02* (2006.01)

(52) U.S. Cl.
CPC ............ *E05F 1/1058* (2013.01); *B62D 33/03* (2013.01); *E05F 3/02* (2013.01); *E05Y 2900/546* (2013.01)

(58) Field of Classification Search
CPC ............... B62D 33/0273; B62D 33/03; E05Y 2900/544; E05Y 2900/546; E05F 3/02; E05F 1/1091; E05F 1/105; E05F 1/1058

(Continued)

(56) References Cited

U.S. PATENT DOCUMENTS 5,954,383 A * 9/1999 Beck .................. B62D 33/0273
296/57.1
6,196,609 B1 * 3/2001 Bowers .............. B62D 33/0273
296/57.1

(Continued)

FOREIGN PATENT DOCUMENTS

CN 103557259 A * 2/2014
CN 216279139 U * 4/2022

(Continued)

OTHER PUBLICATIONS

English language Abstract of DE102004045004B4.

(Continued)

*Primary Examiner* — Jason S Morrow
(74) *Attorney, Agent, or Firm* — William J. Barber; WARE FRESSOLA MAGUIRE & BARBER LLP

(57) ABSTRACT

A wire-rope-system includes a guide-cylinder, compression-spring, plunger and wire-rope for reducing a tailgate's opening-speed in a vehicle/trailer having a side-board-wall-or-tailgate. The guide-cylinder arranged within the side-board-wall-or-tailgate has front-end-and-back-end-portions. The compression-spring arranged within the guide-cylinder has front-and-back-ends. The compression-spring's front-end attaches to the guide-cylinder's front-end-portion and its back-end attaches to the plunger that moves axially within the guide-cylinder. The wire-rope extends through the front-end-portion's opening, and has backend-and-front-ends attached to the plunger and the side-board-wall-or-tailgate. The plunger's slide-membrane's circumferential-edge abuts the guide-cylinder's inner-wall, separating the guide-cylinder's inner-space into a back-air-chamber between the slide-membrane's rear-side and guide-cylinder's back-end-portion, and into a front-air-chamber between the slide-membrane's front-side and guidecylinder's front-end-portion. The back-air-chamber's air-flow-regulating- (Continued)

opening connects to the guide-cylinder's exterior-side. The slid-membrane's configuration blocks/reduces movement towards the front-end-portion and air-flow between the front-air-chamber's circumferential-edge and the guide-cylinder's inner-wall to the back-air-chamber, damping the wire-rope's movement and reducing the tailgate's opening-speed.

20 Claims, 8 Drawing Sheets

(58) Field of Classification Search
    USPC ....................................... 296/57.1, 56, 146.8
    See application file for complete search history.

(56)                     References Cited

U.S. PATENT DOCUMENTS

| | | | | |
|---|---|---|---|---|
| 6,341,809 | B1 * | 1/2002 | Chapman | E05F 1/1058 |
| | | | | 49/352 |
| 7,029,050 | B1 * | 4/2006 | Johnson | B60P 1/26 |
| | | | | 296/61 |
| 7,547,055 | B2 | 6/2009 | Stratten | |
| 7,614,679 | B1 * | 11/2009 | Johnson | B60P 1/438 |
| | | | | 296/57.1 |
| 7,695,043 | B2 | 4/2010 | Zagoroff | |
| 8,444,200 | B2 | 5/2013 | Zagoroff | |
| 10,557,515 | B2 * | 2/2020 | Keller | F16F 9/0218 |
| 10,889,227 | B1 * | 1/2021 | Norfleet | E05F 1/14 |
| 11,085,217 | B2 * | 8/2021 | Rittenhouse | E05F 1/1075 |
| 11,254,371 | B2 * | 2/2022 | Harris | B62D 33/03 |
| 2008/0066385 | A1 * | 3/2008 | Roach | E05F 1/1091 |
| | | | | 49/386 |
| 2008/0217948 | A1 * | 9/2008 | Kobelman | B62D 33/0273 |
| | | | | 296/57.1 |
| 2010/0037528 | A1 * | 2/2010 | Lambright | E05F 1/1058 |
| | | | | 296/61 |

FOREIGN PATENT DOCUMENTS

| | | | | |
|---|---|---|---|---|
| DE | 3923208 | C2 | 3/1994 | |
| DE | 19916092 | A1 | 10/2000 | |
| DE | 20217231 | U1 | 1/2003 | |
| DE | 10343518 | A1 * | 4/2004 | F16F 9/0218 |
| DE | 102007043882 | A1 | 3/2009 | |
| DE | 102005007741 | B4 | 11/2010 | |
| DE | 102004045004 | B4 | 8/2013 | |
| JP | H0576894 | U * | 10/1993 | F16F 9/0218 |
| KR | 100222168 | B1 * | 10/1999 | E05F 3/02 |
| KR | 2021074453 | A * | 6/2021 | E05F 3/02 |

OTHER PUBLICATIONS

English language Abstract of DE102007043882A1.
English language Abstract of DE19916092A1.
English language translation of DE20217231U1.
English language translation of DE3923208C2.
English language translation of DE102005007741B4.

* cited by examiner

WIRE ROPE SYSTEM

BACKGROUND

The present invention relates to a wire rope system for supporting an opening movement and a closing movement of a tailgate of a vehicle or a trailer, a vehicle and a trailer comprising such wire rope system, and a method for adapting a wire rope system to a tailgate of a vehicle or trailer.

Vehicles or trailers having a tailgate which opens downwards often comprise a support device for supporting the movement of the tailgate. One kind of tailgate support is known from the document DE 10 2004 045 004 A1. This support is not suitable for meeting the requirements for tailgates of pick-up trucks, especially with respect to the opening times and the forces needed.

Accordingly, it would be beneficial to provide a compact wire rope system, which can be manufactured at low cost and which support both the opening and the closing movements of a tailgate of any size and weight in a reliable manner, and a corresponding support of the tailgate.

BRIEF DESCRIPTION

According to aspect, a wire rope system for supporting an opening movement and a closing movement of a tailgate of a vehicle or a trailer is provided, which comprises:
  a guide cylinder configured to be arranged within a side board wall or within a tailgate of a vehicle or a trailer, and comprising a front end portion with an opening and a back end portion;
  a compression spring arranged within the guide cylinder, and having a front end and a back end;
  a plunger element configured to be movable axially within the guide cylinder;
  the compression spring being attached with its front end to the front end portion of the guide cylinder and being attached with its back end to the plunger element; and
  a wire rope extending through the opening in the front end portion of the guide cylinder, and comprising a back end attached to the plunger element and a front end to be attached to a tailgate or a side board wall of a vehicle or a trailer;
  wherein the plunger element comprises a slide membrane element configured such that its circumferential edge abuts to the inner wall of the guide cylinder, thus separating the inner space of the guide cylinder into a back air chamber between the rear side of the slide membrane element and the back end portion of the guide cylinder, and into a front air chamber between the front side of the slide membrane element and the front end portion of the guide cylinder;
  wherein an air flow regulating opening is arranged within the back air chamber and connects the back air chamber to the exterior side of the guide cylinder; and
  wherein the slide membrane element is configured such that during movement towards the front end portion of the guide cylinder air flow from the front air chamber between its circumferential edge and the inner wall of the guide cylinder to the back air chamber is blocked or reduced, thus exerting a damping function to the movement of the wire rope and reducing the opening speed of the tailgate.

In addition to one or more of the features described above, the slide membrane element is configured such that during movement towards the back end portion of the guide cylinder it allows air to flow between its circumferential edge and the inner wall of the guide cylinder from the back air chamber to the front air chamber, allowing an undamped movement.

In addition to one or more of the features described above, or as an alternative, the slide membrane element has a round shape with an inner fixing portion by means of which it is attached to the plunger element, and with an outer circumferential portion which is inclined into the direction of the front end portion of the guide cylinder or inclined into the direction of the back end portion of the guide cylinder.

In addition to one or more of the features described above, or as an alternative, the slide membrane element is made of plastics, rubber or leather material.

In addition to one or more of the features described above, or as an alternative, an air flow regulating opening is arranged within the back air chamber and connects the back air chamber to the exterior side of the guide cylinder; and the air flow regulating opening is configured for enabling an air flow into the back air chamber during movement of the slide membrane element towards the front end portion of the guide cylinder, and for enabling an air flow out of the back air chamber during movement of the slide membrane element towards the back end portion of the guide cylinder.

In addition to one or more of the features described above, or as an alternative, the air flow regulating opening is arranged within the inner wall of the guide cylinder adjacent the back end portion of the guide cylinder. The diameter of the air flow regulating opening can be between 0.4 and 1.5 mm.

In addition to one or more of the features described above, or as an alternative, a one-way valve is arranged within the back air chamber, which is configured to prevent air flow from the exterior side to the back air chamber of the guide cylinder during movement of the slide membrane element towards the front end portion of the guide cylinder; and to enable air flow out of the back air chamber during movement of the slide membrane element towards the back end portion of the guide cylinder.

In addition to one or more of the features described above, or as an alternative, the one-way valve is arranged within the back end portion of the guide cylinder. The one-way valve can be configured as a duck valve.

In addition to one or more of the features described above, or as an alternative, the compression spring is movable between a fully expanded state in which the front end of the wire rope extends out of the front end portion of the guide cylinder by a first length, wherein the fully expanded state corresponds to a closed position of the tailgate; and a fully compressed state in which the front end of the wire rope extends out of the front end portion of the guide cylinder by a second length, wherein the fully compressed state corresponds to an open position of the tailgate.

In addition to one or more of the features described above, or as an alternative, the difference between the open length of the compression spring in the fully expanded state and the block length of the compression spring in the fully compressed state substantially corresponds to at least of: the difference between the first and the second length; and the distance of the tailgate fixing point of the front end of the wire rope between the open and closed positions of the tailgate.

In addition to one or more of the features described above, or as an alternative, a deflection guide element is provided at the outer portion of the front end portion of the guide cylinder configured to deflect the wire rope between a first pull-in direction in which the wire rope extends inside of the guide cylinder and a second direction in which the wire rope extends outside of the guide cylinder, particularly in case the wire rope system is arranged within the tailgate.

In addition to one or more of the features described above, or as an alternative, the block length of the compression spring in the fully compressed state limits the open opening movement of the wire rope and correspondingly of the tailgate, and defines a stop for the open position of the tailgate.

In addition to one or more of the features described above, or as an alternative, the compression spring comprises a number of coils and integrated dead coils to adjust its spring rate to the weight of the tail gate and to improve the guidance of the compression spring within the guide cylinder.

In addition to one or more of the features described above, or as an alternative, the compression spring comprises a coating, particularly a flock coating.

In addition to one or more of the features described above, or as an alternative, the guide cylinder of the wire rope system is configured to be arranged within the side board wall of a vehicle or a trailer and the front end of the wire rope is configured to be attached to a side portion of the tailgate of the vehicle or the trailer.

In addition to one or more of the features described above, or as an alternative, the guide cylinder of the wire rope system is configured to be arranged within the tailgate of a vehicle or a trailer and the front end of the wire rope is configured to be attached to the side board wall of the vehicle or the trailer.

According to another aspect, a vehicle comprises
a left side board wall,
a right side board wall,
a tailgate configured to be opened downwards, and
at least one wire rope system as described herein, the guide cylinder of which is arranged within one of the side board walls,
wherein the front end of the wire rope is attached to a side portion of the tailgate.

According to another aspect, a trailer comprises
a left side board wall,
a right side board wall,
a tailgate configured to be opened downwards, and
at least one wire rope system as described herein, the guide cylinder of which is arranged within one of the side board walls,
wherein the front end of the wire rope is attached to a side portion of the tailgate.

According to another aspect, a vehicle comprises
a left side board wall,
a right side board wall,
a tailgate configured to be opened downwards, and
at least one wire rope system as described herein, the guide cylinder of which is arranged within a side portion of the tailgate,
wherein the front end of the wire rope is attached to the corresponding side board wall.

According to another aspect, a trailer comprises
a left side board wall,
a right side board wall,
a tailgate configured to be opened downwards, and
at least one wire rope system as described herein, the guide cylinder of which is arranged within a side portion of the tailgate,
wherein the front end of the wire rope is attached to the corresponding side board wall.

According to another aspect, a method for adapting a wire rope system to a tailgate of a vehicle or a trailer is provided, the method comprising the following steps:

providing:
a guide cylinder having a front end portion, a back end portion, and an inner wall, and defining an inner space with an axial length and an inner diameter;
a plunger element comprising a slide membrane element, which circumferential edge is configured to abut to the inner wall of the guide cylinder; and
a wire rope comprising a back end which is attached to the plunger element, and a front end to be attached to a tailgate or a side board wall of a vehicle or a trailer;
providing a compression spring comprising:
an outside diameter corresponding to the inner diameter of the guide cylinder;
an open length in the fully expanded state corresponding to the axial length of the inner space of the guide cylinder; and
a spring wire size and a number of coils and integrated dead coils to adjust the spring rate to the weight of the tail gate;
attaching the compression spring with its back end to the plunger element;
inserting the plunger element with the slide membrane element, the rear portion of the wire rope and the compression spring into the guide cylinder;
threading the front portion of the wire rope through the opening in the front end portion of the guide cylinder, to form a wire rope system as described herein.

In addition to one or more of the features described above, the method further comprises:
providing an air flow regulating opening within the back air chamber to connect the back air chamber to the exterior side of the guide cylinder; and
adjusting the size of the air flow regulating opening to enable a desired air flow into the back air chamber during movement of the slide membrane element towards the front end portion of the guide cylinder, in order to adjust the damping function to the movement of the wire rope and the opening speed of the tailgate.

In addition to one or more of the features described above, or as an alternative, the method further comprises:
attaching the guide cylinder of the wire rope system to a side portion of a tailgate of a vehicle or a trailer and attaching the front end of the wire rope to the corresponding side board wall of the vehicle or the trailer; or
attaching the guide cylinder of the wire rope system to a side board wall of a vehicle or a trailer and attaching the front end of the wire rope to the corresponding side portion of the tailgate of the vehicle or the trailer.

The detailed description explains embodiments of the disclosure, together with advantages and features, by way of example with reference to the drawings.

DETAILED DESCRIPTION

Figure 1:
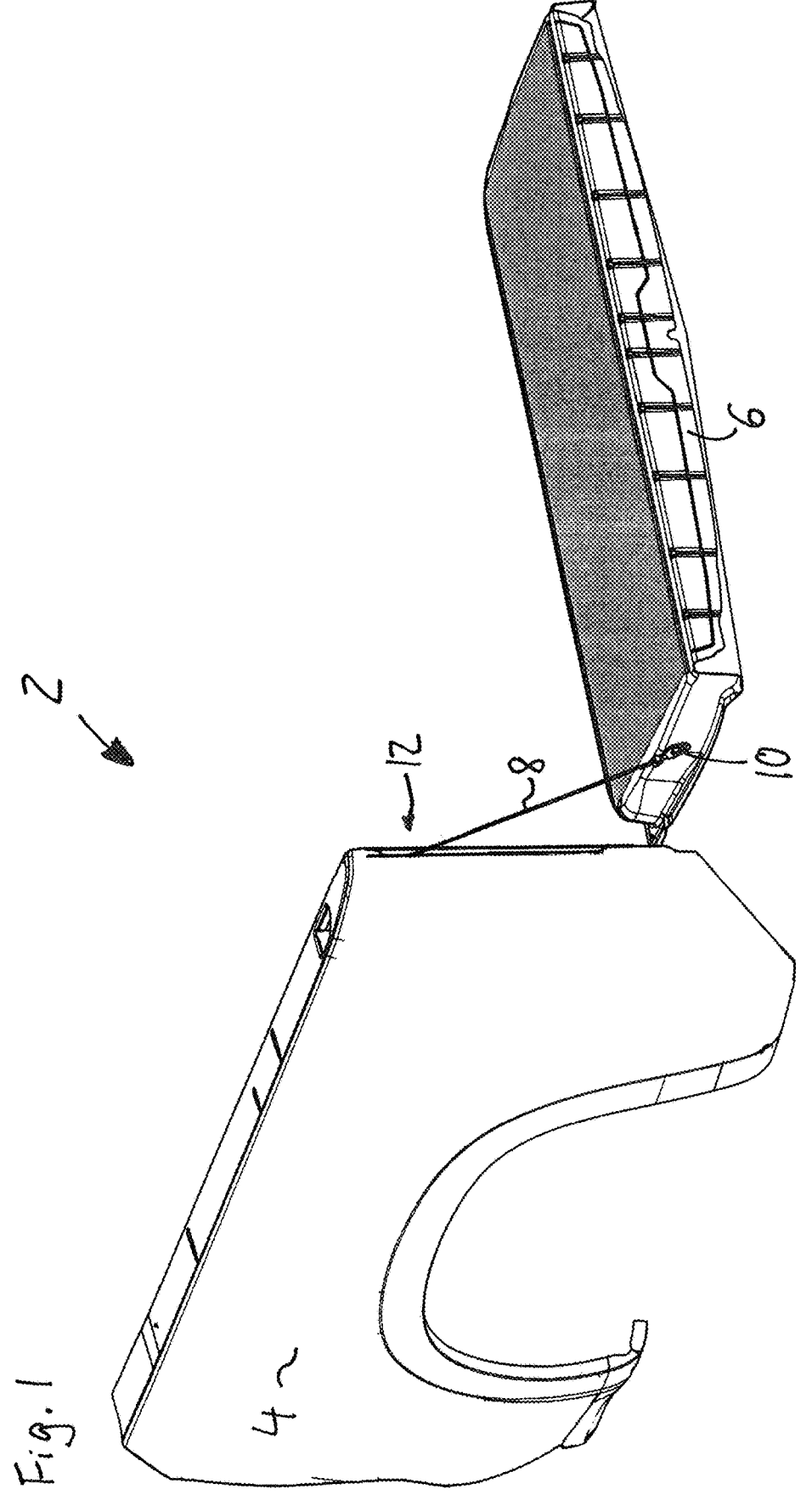
FIG. 1 shows a schematic perspective view of a vehicle with a sideboard wall, a tailgate in its open position, and a wire rope system, according to an embodiment of the invention.

FIG. 1 shows a schematic perspective view of a vehicle 2 with a sideboard wall 4, a tailgate 6 in its opened position, and a wire rope system 12.

The vehicle 2 is of the tailgate type having a tailgate 6 which opens downwards. While FIG. 1 shows a vehicle 2 with a tailgate 6 and a wire rope system 12, the wire rope system 12 can also be provided in a trailer having a tailgate which opens downwards.

In FIG. 1 only the left-hand sideboard wall 4 is shown. On the right-hand side of the vehicle 2 a corresponding sideboard wall 4 and a corresponding wire rope system 12 are arranged (not shown).

The wire rope system 12 comprises a guide cylinder 14, see FIGS. 2 to 7, which is arranged and fastened within the sideboard wall 4, particularly in a horizontal orientation at an upper inner region of the sideboard wall 4. The guide cylinder 14 can be made of metal, in particular Aluminium, or plastics material and can also be referred to as a tube.

A wire rope 8, in particular a flexible wire rope 8, extends out of a front end opening 22 of the front and portion 16 of the guide cylinder 14, see FIGS. 4 to 7, makes a bend downwards and is attached with its wire rope front end 10 to a lateral side portion of the tailgate 6 at an intermediate to upper/rear portion of the lateral side of the tailgate 6, as it is shown in FIG. 1.

The front end opening 22 is open to the environment. Air from the exterior of the guide cylinder 14, in particular from the front of its front end portion 16 can enter into the inside of the guide cylinder 14 through the front end opening 22, in particular through a gap between the front end opening 22 and the wire rope 8.

The wire rope front end 10 can be provided with an appropriate fixing means, which is configured in the exemplary embodiments as described herein, as a metal part comprising an opening, which opening can receive an appropriate pin positioned at the sidewall of the tailgate 6, see FIG. 1.

One can well imagine that if the wire rope 8 moves rearwards, the tailgate 6 moves from its horizontal open position, which is shown in FIG. 1, to a closed vertical position (closing movement). One can also well imagine that, starting from the closed vertical position of the tailgate 6, the tailgate 6 pulls the wire rope 8 out of the guide cylinder 14, by its weight, and the tailgate 6 moves to its horizontal open position, as it is shown in FIG. 1 (opening movement).

The wire rope system 12 as it is described herein exerts a damping function to the tailgate 6 during its opening movement, and exerts a supporting function to the tailgate 6 during its closing movement.

In an alternative embodiment, which is not shown here, the guide cylinder can be arranged within the tailgate 6, particularly in a transverse direction, with its front end portion and a deflection guide (not shown) being arranged at the lateral side portion of the tailgate. The front end portion and the deflection guide (not shown) can be arranged approximately at the same position where the wire rope front end is shown in FIG. 1. In this embodiment, the wire rope extends through the front opening of the front end portion of the guide cylinder, is deflected to extend in an upwardly inclined direction corresponding to the direction of the wire rope as it is shown in FIG. 1, and is attached with its wire rope front end to an upper portion of the sideboard wall.

Figure 2:
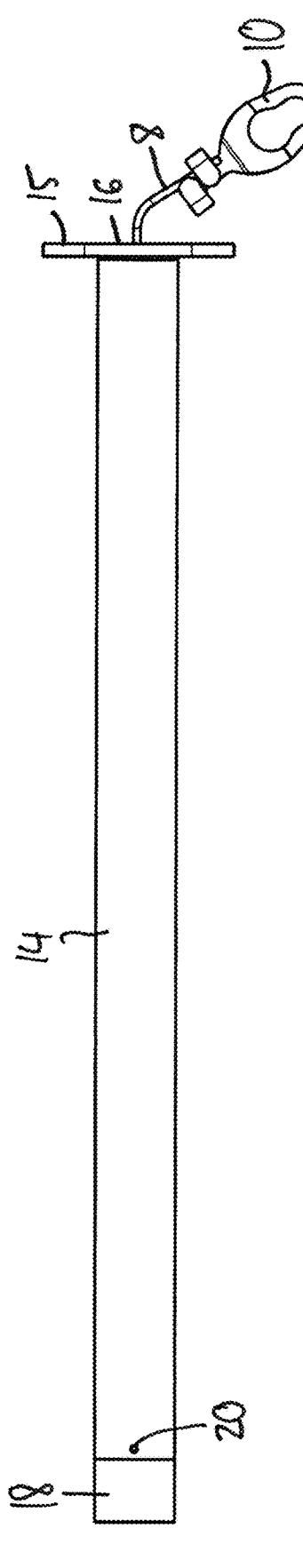
FIGS. 2 and 3 show respective side views of a wire rope system, according to a further embodiment of the invention, with a wire rope front end extending out of a front end portion of a guide cylinder by a first length (FIG. 2) and by a second length (FIG. 3).

FIG. 2 shows a side view of the wire rope system 12, with the wire rope front end 10 extending out of the front end portion 16 of the guide cylinder 14 by a first length, which first length corresponds to the closed vertical position of the tailgate 6.

Figure 3:
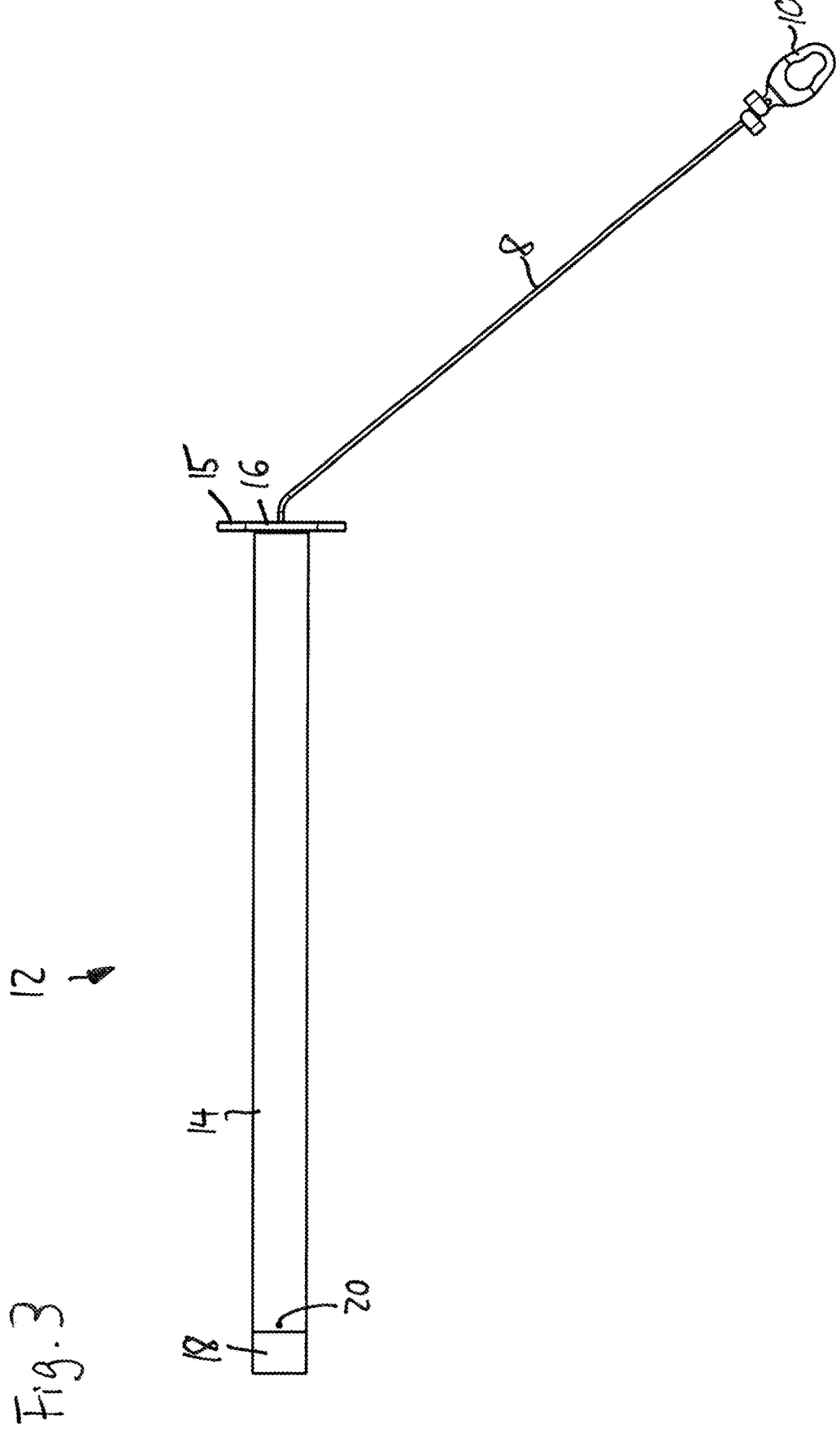

In FIG. 3 the wire rope front end 10 extends out of the front end portion 16 of the guide cylinder 14 by a second length, which second length corresponds to the open position of the tailgate 6.

At the right hand side of the guide cylinder 14, a fastening flange 15 is arranged, by which the guide cylinder 14 can be fastened to a corresponding portion within the sideboard wall 4 or within the tailgate 6. The wire rope 8 extends through a front end opening 22 of the front end portion 16. The left-hand side of the guide cylinder 14 is closed by a back end portion 18.

An airflow regulating opening 20 is arranged close to the back end portion 18 within the cylinder wall of the guide cylinder 14 and connects its interior to the exterior side of the guide cylinder 14.

A deflection element can be arranged in front of (in FIGS. 2 and 3 to the right of front end portion 16) of the guide cylinder 14 and can deflect the wire rope 8 between a first pull-in direction in which the wire rope 8 extends inside of the guide cylinder 14 and a second, inclined direction in which the wire rope 8 extends outside of the guide cylinder 14. The pull-in direction can well be seen in FIGS. 6 and 7, the second, inclined direction can well be seen in FIGS. 2 and 3.

Figure 4:
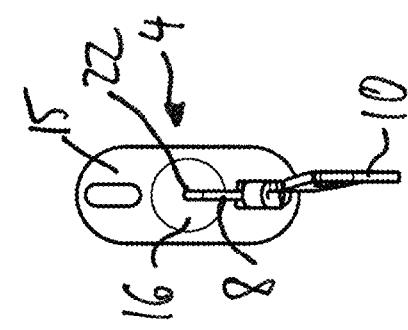
FIGS. 4 and 5 show respective front views onto the guide cylinder of the wire rope system of FIGS. 2 and 3, with the wire rope extending out of the front end portion by a first length (FIG. 4) and by a second length (FIG. 5).
Figure 4:
Figure 5:
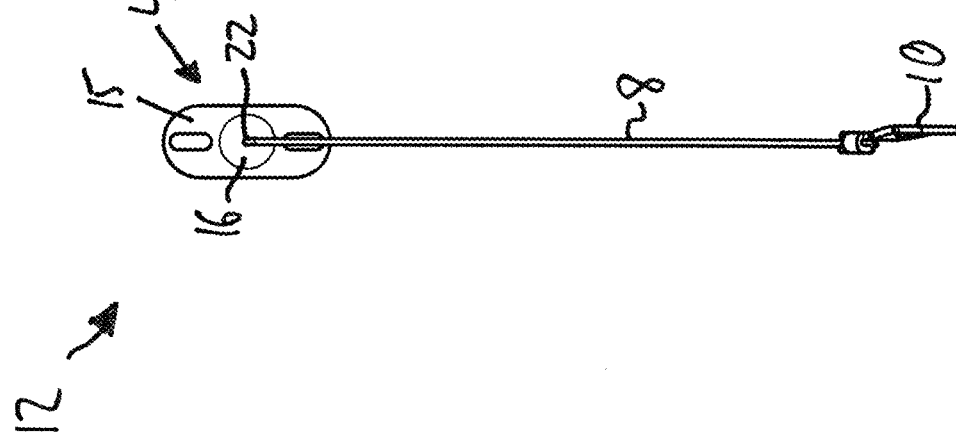

FIGS. 4 and 5 show a front view onto the guide cylinder 14, with the wire rope 8 extending out of the front end portion 16 by a first length (FIG. 4) and by a second length (FIG. 5).

In FIGS. 4 and 5 it can well be seen that the fastening flange 15 has an oblong shape with two elongated holes by which the guide cylinder 14 can be fastened, particularly screwed, to a corresponding part within the sideboard wall 4 or within the tailgate 6. In FIGS. 4 and 5 it can well be seen that the wire rope 8 extends through a front end opening 22 within the front end portion 16 of the guide cylinder 14.

Figure 6:
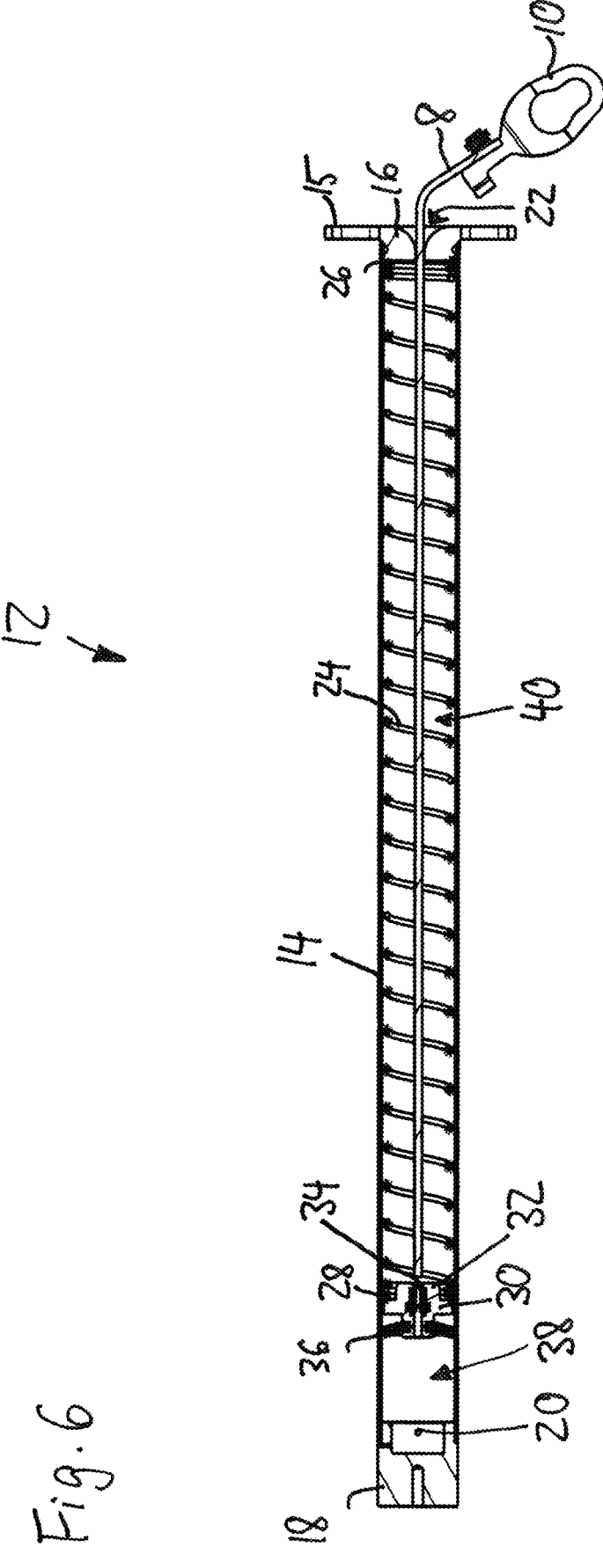
FIGS. 6 and 7 show the wire rope system of FIGS. 2 to 5 in a first position which corresponds to the closed vertical position of the tailgate (FIG. 6), and in a second position which corresponds to the horizontal open position of the tailgate (FIG. 7).

FIG. 6 shows a sectional view taken along the vertical symmetrical plane of the guide cylinder 14, with the wire rope 8 extending out of the front end portion 16 by a first length, and the compression spring 24 being in its fully expanded state.

Figure 7:
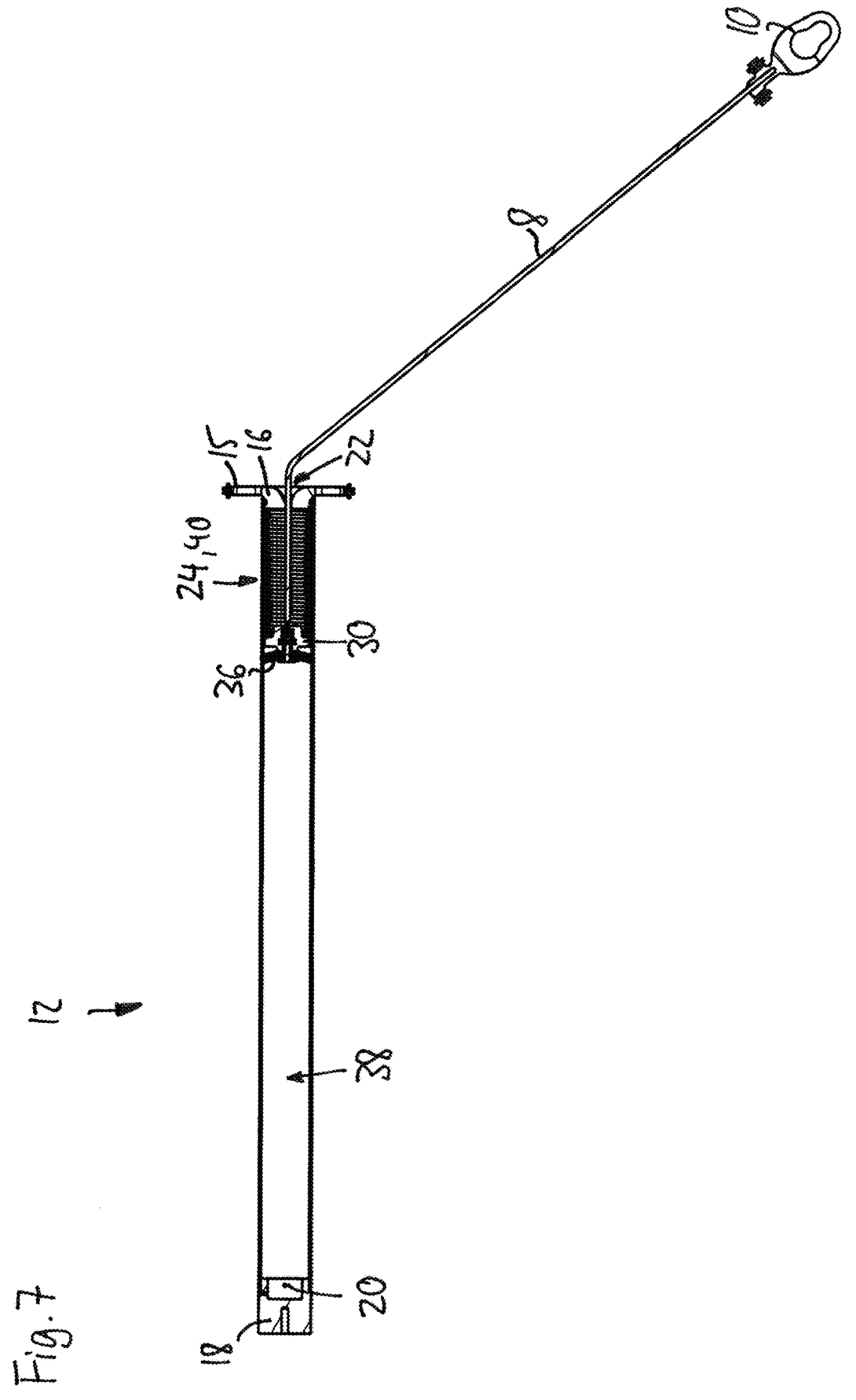

FIG. 7 shows a sectional view of the guide cylinder 14, with the wire rope 8 extending out of the front end portion 16 by a second length, and the compression spring 24 being in its fully compressed state.

The compression spring 24 is arranged within the guide cylinder 14, its front end 26 is positioned adjacent to the front end portion 16, and its back end 28 is positioned adjacent to a plunger element 30.

The wire rope back end 34 is attached to the plunger element 30 and extends along the first axial pull-in direction through the inner space of the guide cylinder 14 and particularly through the inner space of the compression spring 24 to the front end portion 16. The wire rope back end 34 further extends through the front end opening 22 within the front end portion 16 to a position or region in front of the front end portion 16 where it may be deflected by a deflection element, not shown, into a second, downwardly inclined direction. The outer end of the front end portion 16 can be formed in a bend, tapering fashion.

The plunger element 30 has a stepped shape, and comprises—from front to back—a mainly cylindrically front portion which forms an attachment portion 32 for the back end 28 of the compression spring, an intermediate portion of greater diameter which slides along the inner wall of the guide cylinder 14, and a rear portion of reduced diameter with a membrane element seat that firmly holds a slide membrane element 36. The membrane element seat within the rear portion of reduced diameter of the plunger element 30 can be formed as a circumferential groove into which the slide membrane element 36 is inserted with its inner circumferential edge portion.

As can be seen in FIG. 6, the wire rope back end 34 is received and held firmly within the plunger element 30.

The slide membrane element 36 has a circular, plate-like or cup-like shape with a central opening through with which it is inserted into the membrane element seat within the rear portion of reduced diameter of the plunger element 30. The end of the rear portion of reduced diameter of the plunger element 30 covers the inner circumferential edge of the slide membrane element 36, The slide membrane element is made of plastics, rubber or leather material and is dimensioned such that it circumferential edge abuts to the inner wall of the guide cylinder 14.

Thus, the slide membrane element 36 separates the inner space within the guide cylinder 14 into (a) a back air chamber 38 between the rear side of the slide membrane element 36 and the end of the rear portion of reduced diameter of the plunger element 30 on the one hand and the back end portion 18 of the guide cylinder 14 on the other hand, enclosed by the inner wall of the guide cylinder 14 and into (b) a front air chamber 40 between the front side of the slide membrane element 36 and the front end portion 16 of the guide cylinder 14, enclosed by the inner wall of the guide cylinder 14.

The intermediate portion of greater diameter of the plunger element 30 is dimensioned and configured such that during slide movement to the front or to the back it does not form a seal with the inner wall of the guide cylinder 14. Rather, air can pass between the outer edge of this intermediate portion of the plunger element 30 and the inner wall of the guide cylinder 14 during axial movement of the same.

In the sectional view of FIGS. 6 and 7 it can be seen that the slide membrane element 36, particularly its outer circumferential portion is inclined into the direction of the back end portion 18 of the guide cylinder 14. This allows for different damping characteristics during movement of the slide membrane element 36 towards the front end portion 16 of the guide cylinder 14 and during movement towards the back end portion 18 of the guide cylinder 14.

In an alternative embodiment (not shown), the slide membrane element, particularly its outer circumferential portion can be inclined into the direction of the front end portion of the guide cylinder.

The air flow regulating opening 20, which has been explained above, typically has a diameter of between 0.4 and 1.5 mm.

The angle between the outer circumferential portion of the slide membrane element 36 and a radial plane is typically between 2 and 30°. With respect to the radial plane, seen from the direction of the back end portion 18, the shape of the slide membrane element 36 can generally be referred to as V- or U-shape.

During tailgate closing movement from the second position of FIG. 7 (corresponding to the horizontal open position of the tailgate 6) to the first position of FIG. 6 (corresponding to the closed vertical position of the tailgate 6), the slide membrane element 36 lets the air by-pass between the guide cylinder 14 and its outer circumferential edge.

During tailgate opening movement from the first position of FIG. 6 to the second position of FIG. 7, the slide membrane element 36 acts like a one-way valve, blocking or reducing air flow from the front air chamber 40 between its circumferential edge and the inner wall of the guide cylinder 14 to the back air chamber 38, pushing air from the inside of the front air chamber 40 out of the guide cylinder 14 through the front end opening 22, particularly through the gap between the wire rope 8 and the front end opening 22, and sucking outside air through the air flow regulating opening 20 into the back air chamber 38.

The thickness of the material of the slide membrane element 36 is typically in a range between 0.5 and 5 mm.

FIG. 6 shows the wire rope system 12 in a first position which corresponds to the closed vertical position of the tailgate 6. In this first position, the compression spring 24 is in its fully expanded state (open length), in which the wire rope 8 extends out of the front end portion 16 of the guide cylinder 14 by a first, small length.

FIG. 7 shows the wire rope system 12 in a second position which corresponds to the horizontal open position of the tailgate 6, which is shown in FIG. 1. In this second position, the compression spring 24 is in its fully compressed state (block length), and the wire rope 8 extends out of the front end portion 16 of the guide cylinder 14 by a second, great length.

In the first position, the back air chamber 38 to the left of the slide membrane element 36 is small, and the front air chamber 40 to the right of the slide membrane element 36 is great, whereas in the second position, the back air chamber 38 left of the slide membrane element 36 is great and the front air chamber 40 to the right of the slide membrane element 36 is small.

During tailgate opening movement from the first position of FIG. 6 (corresponding to the closed vertical position of the tailgate 6) to the second position of FIG. 7 (corresponding to the horizontal open position of the tailgate 6), the slide membrane element 36 slides along the inner wall of the guide cylinder 14 and blocks or reduces air flow from the front air chamber 40 to the back air chamber 38.

Thus, the back air chamber 38 temporarily forms a low-pressure region and the slide membrane element 36 exerts a damping function to the movement of the wire rope 8 and reduces the opening speed of the tailgate 6. In this way, a smooth tailgate opening movement is attained.

The smooth movement of the slide membrane element 36 and together with it of the plunger element 30 and the wire rope 8 is a result of air pressure, spring force, and friction.

The wire rope systems 12 according to exemplary embodiments as described herein use air and the air pressure in the front air chamber 40 and the back air chamber 38 as medium for the damping function.

The wire rope systems 12 according to exemplary embodiments as described herein distinguish over gas springs using a special gas for obtaining a damping function, which typically form closed systems and which typically require high sealing efforts.

The slide membrane element 36 constitutes a pneumatic seal between the front air chamber 40 and the back air chamber 38.

During this tailgate opening movement, air flows from the exterior the guide cylinder 14 into the back air chamber 38 through the air flow regulating opening 20. However, this airflow is limited by the comparably small size of the air flow regulating opening 20. The diameter of the air flow regulating opening is typically between 0.4 and 1.5 mm. This effect contributes to the damping function to the movement of the wire rope 8 and to the reduction of the opening speed of the tailgate 6.

During tailgate closing movement from the second position of FIG. 7 (corresponding to the horizontal open position of the tailgate 6) to the first position of FIG. 6 (corresponding to the closed vertical position of the tailgate 6), the slide membrane element 36 slides along the inner wall of the guide cylinder 14, but allows air to flow between its circumferential edge and the inner wall of the guide cylinder 14 from the back air chamber 38 to the front air chamber 40. Thus, the slide membrane element 36 allows an undamped movement of the plunger element 30 and of the wire rope 8.

During this tailgate closing movement, air flows out of the back air chamber 38 to the exterior the guide cylinder 14 through the air flow regulating opening 20.

Since the spring 24 is a compression spring, the spring force pulls the wire rope 8 into the guide cylinder 14 and exerts a tension force onto the tailgate 6, to move it from its open to its closed position.

The different characteristics of the slide membrane element 36 during tailgate opening movement and during tailgate closing movement result from its inclined configuration and from its particular material, as has been described above.

The wire rope system 12 works like a bike pump, wherein the downstroke pressure movement of the bike pump corresponds to the tailgate opening movement and the up-stroke no pressure movement of the bike pump corresponds to the tailgate closing movement.

The difference between the open length of the compression spring 24 in the fully expanded state of FIG. 6 and the block length of the compression spring 24 in the fully compressed state of FIG. 7 substantially corresponds to the difference between the first and the second lengths of the wire rope 8, that have been explained above, and the distance of the tailgate fixing point 10 of the front end of the wire rope 8 between the open and closed positions of the tailgate 6.

The compression spring 24 can comprise integrated dead coils (not shown) to adjust its spring rate to the weight of the tailgate 6 and to improve the guidance of the compression spring 24 within the guide cylinder 14.

The compression spring 24 can comprise a coating, particularly a flock coating (not shown). The flock coating or flocking works like a noise protection, especially in the position tailgate open, preventing coil clash noise.

The wire rope system 12 can be adjusted to different vehicle or trailer applications, in particular to different tailgate 6 weights, without the need to change all or a majority of the parts of the system.

Rather, the same kind of guide cylinder 14 with the same length and size, the same kind of wire rope 8 (the length of which can be adjusted to the particular application), the same kind of plunger element 30 and the same kind of slide membrane element 36 can be used for all different applications and different tailgate 6 weights.

The wire rope system 12 can be adapted to different applications and different tailgate 6 weights by using different compression springs 24 having the same block length and diameter, and by tailoring their spring rate to the particular tailgate weight 6 by providing the needed number of coils and integrated dead coils and by adapting the spring wire size in order to obtain the desired spring rate.

The dead coils can be utilised as a manufacturing compensation for the block length.

Furthermore, the size of the air regulating opening 20 can be adjusted to enable a desired air flow during the opening movement and to achieve, together with the compression spring 24, the desired damping function matching the weight of the tailgate 6.

These integrated dead coils help to better guide the compression spring 24 within the guide cylinder 14 and to decrease of buckling.

Referring again to FIG. 7, it can well be understood that, when the compression spring 24 reaches its fully compressed state where adjacent coils abut to each other, this also forms a hard stop for the wire rope 8, for the wire rope front end 10 and thus for the tailgate 6 defining its open position. When the spring has reached its block length, any additional load applied to it will function similarly as load applied to a tube. It has been found that such hard stop survives several thousand Newtons of load on the wire rope 8.

The closing function of the tailgate 6 for can be supported by hand force.

Due to the front end opening 22 and the air flow regulating opening 20, the wire rope system 12 is an open system. No high efforts for sealing are needed.

Optionally, an electric motor can be provided to obtain a self-opening and self-closing function per key button.

The wire rope system 12 can be integrated and fits inside the used space of the sideboard wall 4 or tailgate 6 of a vehicle 2 or trailer. The customer appearance is unaffected, compared to current wire rope systems.

Figure 8:
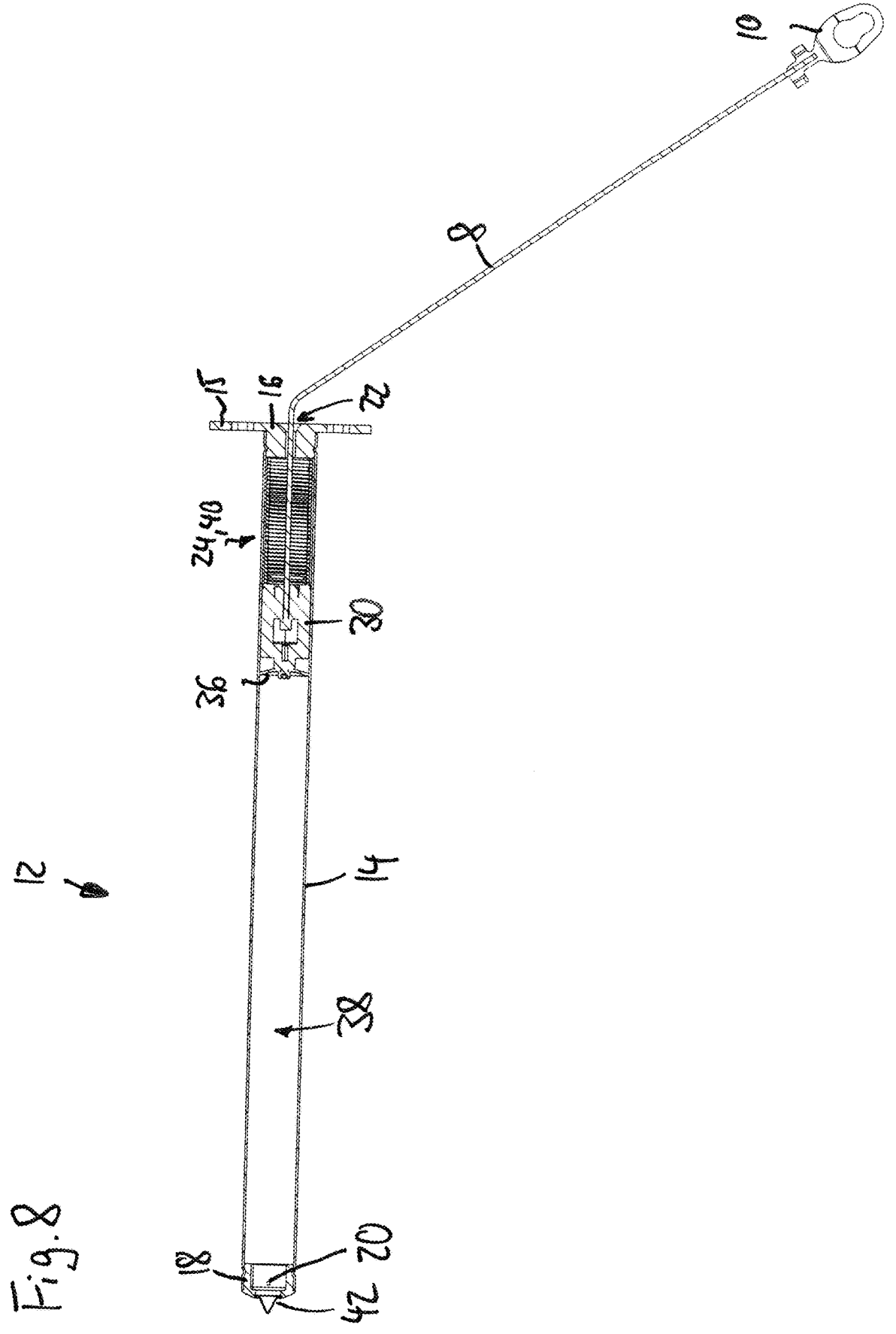
FIG. 8 shows an alternative wire rope system in a second position which corresponds to the horizontal open position of the tailgate.

FIG. 8 shows a wire rope system 12 according to an alternative embodiment.

Like elements are designated with like reference numerals and will not be explained again for brevity.

The wire rope system 12 of FIG. 8 corresponds to the wire rope system 12 as shown and described in FIGS. 2 to 7, whereas, in addition, a one-way valve 42 is arranged in the back end portion 18 of the guide cylinder 14.

The one-way valve 42 can be configured as a duck valve. The one-way valve 42, particularly the duck valve, is configured to prevent air flow from the exterior side to the back air chamber 38 of the guide cylinder 14 during movement of the slide membrane element 36 towards the front end portion 16 of the guide cylinder 14, and to enable air flow out of the back air chamber 38 during movement of the slide membrane element 36 towards the back end portion 18 of the guide cylinder 14.

The plunger element 30, especially its front and intermediate portions are slightly different from those of the plunger element 30 of FIGS. 2 to 7, whereas its rear portion corresponds to the rear portion of the plunger element 30 of FIGS. 2 to 7.

The other advantages and details that have been explained above with respect to FIGS. 2 to 7 also apply to the wire rope system 12 of FIG. 8, and are not repeated here for brevity.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

LIST OF REFERENCE NUMERALS 2 vehicle
4 side board wall
6 tailgate
8 wire rope
10 wire rope front end
12 wire rope system
14 guide cylinder
15 fastening flange
16 front end portion
18 back end portion
20 air flow regulating opening
22 front end opening
24 compression spring
26 front end
28 back end
30 plunger element
32 attachment portion
34 wire rope back end
36 slide membrane element
38 back air chamber
40 front air chamber
42 one-way valve

We claim:

1. A wire rope system for supporting an opening movement and a closing movement of a tailgate of a vehicle or a trailer, the wire rope system comprising:
a guide cylinder configured to be arranged within a side board wall or within a tailgate of a vehicle or a trailer, and comprising a front end portion with an opening and a back end portion;
a compression spring arranged within the guide cylinder, and having a front end and a back end; and
a plunger element configured to be movable axially within the guide cylinder;
the compression spring being attached with its front end to the front end portion of the guide cylinder and being attached with its back end to the plunger element;
a wire rope extending through the opening in the front end portion of the guide cylinder, and comprising a back end attached to the plunger element and a front end to be attached to a tailgate or a side board wall of a vehicle or a trailer;
wherein the plunger element comprises a slide membrane element configured such that its circumferential edge abuts to the inner wall of the guide cylinder, thus separating the inner space of the guide cylinder into a back air chamber between the rear side of the slide membrane element and the back end portion of the guide cylinder, and into a front air chamber between the front side of the slide membrane element and the front end portion of the guide cylinder;
wherein an air flow regulating opening is arranged within the back air chamber and connects the back air chamber to the exterior side of the guide cylinder; and

wherein the slide membrane element is configured such that during movement towards the front end portion of the guide cylinder air flow from the front air chamber between its circumferential edge and the inner wall of the guide cylinder to the back air chamber is blocked or reduced, thus exerting a damping function to the movement of the wire rope and reducing the opening speed of the tailgate.

2. The wire rope system of claim 1, wherein the slide membrane element is configured such that during movement towards the back end portion of the guide cylinder it allows air to flow between its circumferential edge and the inner wall of the guide cylinder from the back air chamber to the front air chamber, allowing an undamped movement.

3. The wire rope system of claim 1, wherein the slide membrane element has a round shape with an inner fixing portion by means of which it is attached to the plunger element, and with an outer circumferential portion which is inclined into the direction of the front end portion of the guide cylinder or inclined into the direction of the back end portion of the guide cylinder.

4. The wire rope system of claim 1, wherein the slide membrane element is made of plastics, rubber or leather material.

5. The wire rope system of claim 1, wherein
an air flow regulating opening is arranged within the back air chamber and connects the back air chamber to the exterior side of the guide cylinder; and
the air flow regulating opening is configured for enabling an air flow into the back air chamber during movement of the slide membrane element towards the front end portion of the guide cylinder, and for enabling an air flow out of the back air chamber during movement of the slide membrane element towards the back end portion of the guide cylinder.

6. The wire rope system of claim 5, wherein
the air flow regulating opening is arranged within the inner wall of the guide cylinder adjacent the back end portion of the guide cylinder; and
the diameter of the air flow regulating opening is between 0.4 and 1.5 mm.

7. The wire rope system of claim 1, wherein a one-way valve is arranged within the back air chamber, which is configured
to prevent air flow from the exterior side to the back air chamber of the guide cylinder during movement of the slide membrane element towards the front end portion of the guide cylinder; and
to enable air flow out of the back air chamber during movement of the slide membrane element towards the back end portion of the guide cylinder.

8. The wire rope system of claim 7, wherein
the one-way valve is arranged within the back end portion of the guide cylinder; and
the one-way valve is configured as duck valve.

9. The wire rope system of claim 1, wherein the compression spring is movable between
a fully expanded state in which the front end of the wire rope extends out of the front end portion of the guide cylinder by a first length, wherein the fully expanded state corresponds to a closed position of the tailgate; and
a fully compressed state in which the front end of the wire rope extends out of the front end portion of the guide cylinder by a second length, wherein the fully compressed state corresponds to an open position of the tailgate.

10. The wire rope system of claim 9, wherein
the compression spring has an open length and a block
    length; and
the difference between the open length of the compression
    spring in the fully expanded state and the block length
    of the compression spring in the fully compressed state
    substantially corresponds to at least of:
    the difference between the first length and the second
        length; and
    the distance of the tailgate fixing point of the front end
        of the wire rope between the open and closed posi-
        tions of the tailgate.

11. The wire rope system of claim 9, wherein
the compression spring has a block length, and
the block length of the compression spring in the fully
    compressed state limits the open opening movement of
    the wire rope and correspondingly of the tailgate and
    defines a stop for the open position of the tailgate.

12. The wire rope system of claim 1, wherein the com-
pression spring comprises a number of coils and integrated
dead coils to adjust its spring rate to the weight of the tail
gate and to improve the guidance of the compression spring
within the guide cylinder.

13. The wire rope system of claim 1, wherein the com-
pression spring comprises a coating, including a flock coat-
ing.

14. A vehicle, comprising
a left side board wall,
a right side board wall,
a tailgate configured to be opened downwards, and
at least one wire rope system of claim 1, the guide
    cylinder of which is arranged within one of the side
    board walls,
wherein the front end of the wire rope is attached to a side
    portion of the tailgate.

15. A trailer, comprising
a left side board wall,
a right side board wall,
a tailgate configured to be opened downwards, and
at least one wire rope system of claim 1, the guide
    cylinder of which is arranged within one of the side
    board walls,
wherein the front end of the wire rope is attached to a side
    portion of the tailgate.

16. A vehicle, comprising
a left side board wall,
a right side board wall,
a tailgate configured to be opened downwards, and
at least one wire rope system of claim 1, the guide
    cylinder of which is arranged within a side portion of
    the tailgate,
wherein the front end of the wire rope is attached to the
    corresponding side board wall.

17. A trailer, comprising
a left side board wall,
a right side board wall,
a tailgate configured to be opened downwards, and at least one wire rope system of claim 1, the guide
    cylinder of which is arranged within a side portion of
    the tailgate,
wherein the front end of the wire rope is attached to the
    corresponding side board wall.

18. A method for adapting a wire rope system to a tailgate
of a vehicle or a trailer, the method comprising the following
steps:
    providing:
        a guide cylinder having a front end portion, a back end
            portion, and an inner wall, and defining an inner
            space with an axial length and an inner diameter;
        a plunger element comprising a slide membrane ele-
            ment, which circumferential edge is configured to
            abut to the inner wall of the guide cylinder; and
        a wire rope comprising a back end which is attached to
            the plunger element, and a front end to be attached
            to a tailgate or a side board wall of a vehicle or a
            trailer;
    providing a compression spring comprising:
        an outside diameter corresponding to the inner diameter
            of the guide cylinder;
        an open length in the fully expanded state correspond-
            ing to the axial length of the inner space of the guide
            cylinder; and
        a spring wire size and a number of coils and integrated
            dead coils to adjust the spring rate to the weight of
            the tail gate;
    attaching the compression spring with its back end to the
        plunger element;
    inserting the plunger element with the slide membrane
        element, the rear portion of the wire rope and the
        compression spring into the guide cylinder; and
    threading the front portion of the wire rope through the
        opening in the front end portion of the guide cylinder,
        to form a wire rope system of claim 1.

19. The method of claim 18, further comprising:
    providing an air flow regulating opening within the back
        air chamber to connect the back air chamber to the
        exterior side of the guide cylinder; and
    adjusting the size of the air flow regulating opening to
        enable a desired air flow into the back air chamber
        during movement of the slide membrane element
        towards the front end portion of the guide cylinder, in
        order to adjust the damping function to the movement
        of the wire rope and the opening speed of the tailgate.

20. The method of claim 18, further comprising:
    attaching the guide cylinder of the wire rope system to a
        side portion of a tailgate of a vehicle or a trailer and
        attaching the front end of the wire rope to the corre-
        sponding side board wall of the vehicle or the trailer; or
    attaching the guide cylinder of the wire rope system to a
        side board wall of a vehicle or a trailer and attaching the
        front end of the wire rope to the corresponding side
        portion of the tailgate of the vehicle or the trailer.

* * * * *